United States Patent
Brooking et al.

(10) Patent No.: US 7,454,201 B2
(45) Date of Patent: *Nov. 18, 2008

(54) SYSTEM FOR PROVIDING MESSAGE SERVICES THROUGH A PRIVATE NETWORK AND MOBILE STATION

(75) Inventors: Michael A. Brooking, Colorado Springs, CO (US); William H. Wiliams, Jr., Colorado Springs, CO (US)

(73) Assignee: Siemens Communications, Inc., Boca Raton, FL (US)

( * ) Notice: Subject to any disclaimer, the term of this patent is extended or adjusted under 35 U.S.C. 154(b) by 69 days.

This patent is subject to a terminal disclaimer.

(21) Appl. No.: 11/105,911

(22) Filed: Apr. 13, 2005

(65) Prior Publication Data

US 2005/0176410 A1    Aug. 11, 2005

Related U.S. Application Data

(63) Continuation of application No. 09/815,858, filed on Mar. 22, 2001, now Pat. No. 6,920,318.

(51) Int. Cl.
*H04M 3/06* (2006.01)
*H04M 7/14* (2006.01)
*H04M 1/00* (2006.01)
*H04M 3/42* (2006.01)
*H04Q 7/00* (2006.01)

(52) U.S. Cl. .................. 455/419; 455/433; 455/555; 379/265.04; 705/53; 370/328

(58) Field of Classification Search .............. 455/419, 455/555, 433; 380/25; 379/265.4, 265; 705/53
See application file for complete search history.

(56) References Cited

U.S. PATENT DOCUMENTS

| | | | |
|---|---|---|---|
| 5,392,346 A | * | 2/1995 | Hassler et al. ......... 379/265.04 |
| 5,506,887 A | | 4/1996 | Emery et al. |
| 5,537,610 A | | 7/1996 | Mauger et al. |
| 5,579,384 A | | 11/1996 | Seymour |
| 5,602,843 A | | 2/1997 | Gray |
| 5,604,737 A | | 2/1997 | Iwami et al. |
| 5,610,974 A | | 3/1997 | Lantto |
| 5,613,100 A | | 3/1997 | Anezaki |
| 5,629,974 A | | 5/1997 | Rajala et al. |
| 5,636,218 A | | 6/1997 | Ishikawa et al. |
| 5,652,787 A | | 7/1997 | O'Kelly |
| 5,655,001 A | | 8/1997 | Cline et al. |

(Continued)

OTHER PUBLICATIONS

"A 'Plug and Play' Wireless Architecture Supporting Packet Data and IP Voice/Multimedia Services," U.S. Appl. No. 09/128,553, Inventors: Patrick Apfel, et al., Aug. 3, 1998.

(Continued)

*Primary Examiner*—William D Cumming (57) ABSTRACT

A method for providing message services is provided that includes receiving a user notification message in an application. A user identifier for at least one recipient of the message is received in the application. The user identifier is operable to identify the recipient. The message and the user identifier are provided from the application to a private network. The private network is operable to transmit the message to a mobile station for the recipient. The mobile station has a corresponding mobile station identifier, and the user identifier is assigned to the mobile station identifier in the private network.

26 Claims, 4 Drawing Sheets

U.S. PATENT DOCUMENTS

| | | |
|---|---|---|
| 5,664,005 A | 9/1997 | Emery et al. |
| 5,713,073 A | 1/1998 | Warsta |
| 5,726,979 A | 3/1998 | Henderson et al. |
| 5,734,699 A | 3/1998 | Lu et al. |
| 5,740,374 A | 4/1998 | Raffali-Schreinemachers |
| 5,742,596 A | 4/1998 | Baratz et al. |
| 5,742,905 A | 4/1998 | Pepe et al. |
| 5,754,539 A | 5/1998 | Metz et al. |
| 5,764,955 A | 6/1998 | Doolan |
| 5,771,275 A | 6/1998 | Brunner et al. |
| 5,793,762 A | 8/1998 | Penners et al. |
| 5,794,009 A | 8/1998 | Coleman et al. |
| 5,809,028 A | 9/1998 | Nethercott et al. |
| 5,818,824 A | 10/1998 | Lu et al. |
| 5,822,569 A | 10/1998 | McPartlan et al. |
| 5,825,883 A * | 10/1998 | Archibald et al. ............. 705/53 |
| 5,839,067 A | 11/1998 | Jonsson |
| 5,862,134 A | 1/1999 | Deng |
| 5,862,481 A | 1/1999 | Kulkarni et al. |
| 5,873,031 A | 2/1999 | Griffith et al. |
| 5,873,033 A | 2/1999 | Hjern et al. |
| 5,878,347 A | 3/1999 | Joensuu et al. |
| 5,887,256 A | 3/1999 | Lu et al. |
| 5,892,950 A | 4/1999 | Rigori et al. |
| 5,898,931 A | 4/1999 | I'Anson et al. |
| 5,901,352 A | 5/1999 | St-Pierre et al. |
| 5,901,359 A | 5/1999 | Malmstrom |
| 5,913,166 A | 6/1999 | Buttitta et al. |
| 5,924,030 A | 7/1999 | Rautiola et al. |
| 5,943,619 A | 8/1999 | Coyne et al. |
| 5,949,775 A | 9/1999 | Rautiola et al. |
| 5,953,322 A | 9/1999 | Kimball |
| 5,953,651 A | 9/1999 | Lu et al. |
| 5,956,331 A | 9/1999 | Rautiola et al. |
| 5,960,004 A | 9/1999 | Ramström et al. |
| 5,960,176 A | 9/1999 | Kuroki et al. |
| 5,960,344 A | 9/1999 | Mahany |
| 5,978,672 A | 11/1999 | Hartmaier et al. |
| 5,978,673 A | 11/1999 | Alperovich et al. |
| 5,995,839 A | 11/1999 | Coursey et al. |
| 5,999,810 A | 12/1999 | Fuentes |
| 5,999,813 A | 12/1999 | Lu et al. |
| 6,002,931 A | 12/1999 | Yamaguchi et al. |
| H1836 H | 2/2000 | Cullen et al. |
| H1837 H | 2/2000 | Fletcher et al. |
| 6,026,086 A | 2/2000 | Lancelot et al. |
| 6,097,817 A | 8/2000 | Bilgic et al. |
| 6,154,650 A | 11/2000 | Abidi et al. |
| 6,571,108 B1 * | 5/2003 | Otsuka et al. ............... 455/433 |
| 6,920,318 B2 * | 7/2005 | Brooking et al. ............ 455/419 |
| 2002/0137500 A1 | 9/2002 | Brooking et al. |

OTHER PUBLICATIONS

"Method and System for Interworking Voice Bearer Messages Between Circuit Switched and Packet-Switched Networks," U.S. Appl. No. 09/499,921, Inventors: James Lyon, et al., Feb. 8, 2002.
ITU-T Recommendation H.323, Dec. 5, 1997.
ITU-T Recommendation H.450.7, Sep. 1998.
"System and Method for User Notification in a Communication System," U.S. Appl. No. 09/815,859, Inventors: Robert L. Monroe, et al., Mar. 22, 2001.
GSM 03.40 version 7.4.0, 1998.
GSM 04.11 version 7.0.0, 1998.
GSM 03.03 version 4.11.1, 2000.
GSM 3GPP TS 05.02 version 4.11.0, 2001.
WAP Architecture, Wireless Application Protocol Architecture Specification, Mar. 30, 1998.
WAP Over GSM USSD, Wireless Application Protocol, Jul. 30, 2001.
Wireless Short Message Service Tutorial, http://www.iec.org/online/tutorials/wire_sms/index.html, Printed Jan. 31, 2002.

* cited by examiner

| LIST IDENTIFIER | USER IDENTIFIER | MOBILE STATION IDENTIFIER |
|---|---|---|
| JOE | MARK | 555-1234 |
| JOE | CATHY | 321-9999 |
| JOE | SALES | LI |
| KAREN | CATHERINE | 321-9999 |
| KAREN | JIM | 456-8228 |
| CLIENT RELATIONS | MARK | 246-9870 |
| ⋮ | ⋮ | ⋮ |
| CLIENT RELATIONS | JACK | 234-5678 |
| SALES | BOB | 444-8642 |
| ⋮ | ⋮ | ⋮ |
| SALES | DONNA | 793-2491 |

FIG. 8

SYSTEM FOR PROVIDING MESSAGE SERVICES THROUGH A PRIVATE NETWORK AND MOBILE STATION

CROSS-REFERENCE TO RELATED APPLICATIONS

This application is a continuation of Ser. No. 09/815,858 filed Mar. 22, 2001 now U.S. Pat. No. 6,920,318 of the same title.

RELATED APPLICATION

This application is related to U.S. Pat. No. 6,920,318 filed on Mar. 22, 2001 for a "Method and System for Providing Message Services in a Communication System".

TECHNICAL FIELD OF THE INVENTION

This invention relates generally to the field of communication systems and more particularly to a method and system for providing message services in a communication system.

BACKGROUND OF THE INVENTION

Communication systems often support Short Message Services as a supplementary feature for users of mobile stations, or wireless devices. Short Message Services typically allow a subscriber in the system to send short text messages from the subscriber's mobile station and to receive short text messages at the subscriber's mobile station. These Short Message Services typically require the use of a Service Center in a public network. The Service Center controls the communication of messages to and from the mobile stations used by the subscribers. In order to route a short text message to the appropriate mobile station, the Service Center typically requires the sender of the message to provide an identifier for the mobile station, such as a telephone number for a cellular telephone or a pager number for a pager. Thus, in this situation, the sender cannot send a message to a mobile station if the sender does not have knowledge of the corresponding mobile station identifier.

SUMMARY OF THE INVENTION

In accordance with the present invention, a method and system for providing message services in a communication system are provided that substantially eliminate or reduce disadvantages and problems associated with conventional systems. In particular, messages may be sent to a mobile station based on an identifier for the user of the mobile station rather than based on an identifier for the mobile station itself, such that a sender need not have knowledge of the identifier for the mobile station.

In accordance with one embodiment of the present invention, a method for providing message services is provided that includes receiving a user notification message in an application. A user identifier for at least one recipient of the message is received in the application. The user identifier is operable to identify the recipient. The message and the user identifier are provided from the application to a private network. The private network is operable to transmit the message to a mobile station for the recipient. The mobile station has a corresponding mobile station identifier, and the user identifier is assigned to the mobile station identifier in the private network.

Technical advantages of one or more embodiments of the present invention include providing an improved method for providing message services. In a particular embodiment, a user identifier for a user is assigned to a mobile station identifier for a mobile station. The assignment of the user identifier to the mobile station identifier may be updated at any suitable time to a different mobile station identifier corresponding to the same or a different mobile station. As a result, a user may receive messages directed to his or her user identifier at any suitable mobile station based on the current assignment. In addition, the sender need not have knowledge of the mobile station identifier for the mobile station at which the user prefers to receive messages. Instead, the sender may send a message to the user based on a user identifier which may be more easily remembered.

Technical advantages of one or more embodiments of the present invention also include allowing a subscriber to set up a personal message recipient list including a plurality of user identifiers provided by that subscriber. Accordingly, the subscriber may provide user identifiers for each of the users which he may easily remember. In addition, a plurality of users may be grouped together as a single message recipient in the list such that, when the group is selected as a message recipient by a subscriber, each of the user identifiers in the group are included with the message. Other technical advantages include allowing a subscriber the option of selecting from either a personal message recipient list set up by that subscriber or from a message recipient list set up by another user in the system.

Other technical advantages of the present invention will be readily apparent to one skilled in the art from the following figures, description, and claims.

BRIEF DESCRIPTION OF THE DRAWINGS

For a more complete understanding of the present invention and its advantages, reference is now made to the following description taken in conjunction with the accompanying drawings, wherein like reference numerals represent like parts, in which.

DETAILED DESCRIPTION OF THE INVENTION

Figure 1:
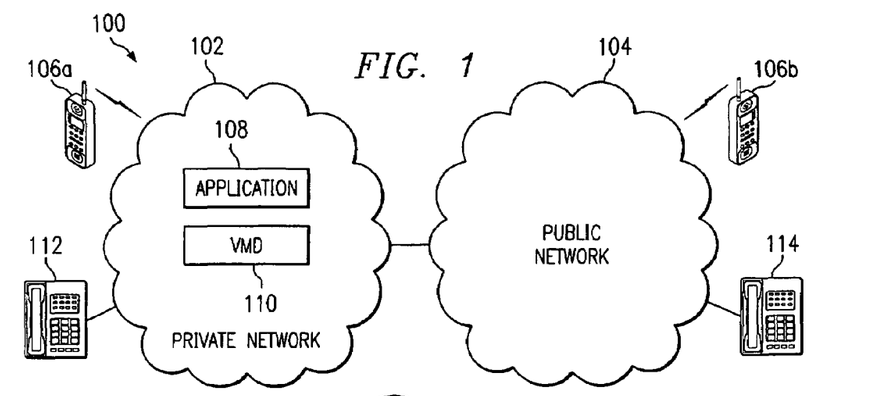
FIG. 1 is a block diagram illustrating a communication system in accordance with one embodiment of the present invention.

FIG. 1 is a block diagram illustrating a communication system 100 in accordance with one embodiment of the present invention. In the illustrated embodiment, system 100 includes one or more private networks 102 and one or more public networks 104. Other embodiments of system 100 may be used without departing from the scope of the present invention.

In one aspect of operation, mobile station 106 receives user notification messages from private network 102 and/or public network 104. The notification messages may, for example, be initiated by an application 108 executing in private network 102, such as a calendar program or an electronic mail program. The user notification messages may also be initiated when a voice mail device (VMD) 110 in private network 102 receives and stores a voice message for a telephone 112 associated with mobile station 106. In one embodiment, when the mobile station 106 is registered with, or communicating with, private network 102, private network 102 may communicate the user notification messages to mobile station 106 without routing the message through public network 104. If private network 102 cannot deliver the message to mobile station 106, private network 102 may or may not communicate the message to public network 104 for delivery to mobile station 106. This allows the subscriber to receive information at mobile station 106 in a fast and convenient manner. It also reduces the number of messages that may be sent through public network 104, which helps to reduce the cost of providing the user notification messages to the subscriber using mobile station 106.

Private network 102 is coupled to public network 104. In this document, the term "couple" refers to any direct or indirect communication between two or more elements, whether or not those elements are in physical contact with one another. Also, in this document, the phrase "private network" refers to any network or portion of a network that communicates with and that can be managed apart from public network 104. Private network 102 facilitates communication between mobile stations 106 and/or telephones 112 communicating with private network 102. Private network 102 also facilitates communication between mobile station 106a or telephone 112 and public network 104. In addition, private network 102 facilitates the communication of user notification messages to and from mobile station 106. Private network 102 may, for example, communicate the messages directly to a mobile station 106, or private network 102 may communicate the messages to public network 104 for delivery to mobile station 106. The messages may be generated by an application 108 or in response to voice mail device 110 receiving a voice message for telephone 112. Private network 102 may comprise any hardware, software, firmware, or combination thereof operable to facilitate communication between mobile stations 106, telephone 112, and/or telephone 114. Private network 102 may, for example, comprise an internal corporate network.

Public network 104 is coupled to private network 102. Public network 104 facilitates communication between telephone 114 and/or mobile stations 106b communicating with public network 104. Public network 104 may also facilitate communication between telephone 114 or mobile station 106b and private network 102. In addition, public network 104 facilitates the communication of user notification messages to and from mobile station 106. Public network 104 may, for example, communicate the messages directly to a mobile station 106, or public network 104 may communicate the messages to private network 102 for delivery to mobile station 106. Public network 104 may comprise any hardware, software, firmware, or combination thereof operable to facilitate communication between telephones 114, telephones 112, and/or mobile stations 106. Public network 104 may, for example, comprise a Global System for Mobile communication (GSM) network.

Application 108 represents one or more applications that may generate and/or communicate user notification messages to a mobile station 106. As used in this document, the term "application" refers to a set of instructions, procedures, functions, objects, classes, instances, and/or related data adapted for implementation in hardware, software, firmware, or a combination thereof. Also, in this document, the phrases "user notification message" and "notification message" refer to a message operable to deliver textual and/or visual information to mobile station 106 to be provided to the subscriber using mobile station 106. A user notification message may have any suitable format, structure, and/or arrangement of information. In one embodiment, application 108 represents a software application operable to be executed by a processor. Application 108 may comprise any application, and the notification messages communicated to mobile station 106 may comprise any message. For example, applications 108 may include a calendar and electronic mail program, such as MICROSOFR OUTLOOK or OUTLOOK EXPRESS. Applications 108 may also include a Web-based interface through which a user may access private network 102 and provide messages for delivery to a mobile station 106. The user notification messages may comprise a text message reminding a subscriber of an upcoming appointment or a text message indicating that e-mail has arrived for the subscriber. Other applications 108 and/or user notification messages may be used without departing from the scope of the present invention.

Voice mail device 110 is operable to receive and store voice messages for one or more telephones 112. In one embodiment, when voice mail device 110 receives a voice message for a telephone 112 associated with mobile station 106, mobile station 106 may receive a user notification message indicating that a voice message has arrived. This may allow, for example, the subscriber using mobile station 106 to access voice mail device 110 and retrieve the voice message. Voice mail device 110 may comprise any hardware, software, firmware, or combination thereof operable to store and facilitate retrieval of voice messages.

In one aspect of operation, user notification messages for mobile station 106 may be produced by application 108 and/or in response to voice mail device 110 receiving a voice message. These messages are communicated to mobile station 106, so these messages may be referred to as "mobile-terminated messages." When a mobile-terminated message has been generated, private network 102 attempts to deliver the message to mobile station 106. In one embodiment, private network 102 attempts to deliver the message to mobile station 106 without routing the message through public network 104. If mobile station 106 acknowledges the successful receipt of the message, private network 102 need take no further action.

When mobile station 106 fails to acknowledge the message after one or multiple delivery attempts by private network 102, private network 102 may store the message for later delivery to mobile station 106, or private network 102 may discard the message. Private network 102 may also forward the message to public network 104 for delivery to mobile station 106. In one embodiment, private network 102 forwards the message to public network 104 by generating a "mobile-originated message." Mobile-originated messages appear to come from a mobile station 106, although other components of private network 102 may generate messages that appear to public network 104 to be mobile-originated messages. Also, private network 102 may forward all or a portion of the unsuccessfully delivered messages to public network 104 for delivery to mobile station 106. In a particular embodiment, private network 102 may select which messages to forward to public network 104 based on the identity of the subscriber or mobile station 106 receiving the message, the type of message being sent, the priority of the message being sent and/or any other criteria For example, one of a plurality of private networks 102 may be prohibited from forwarding any messages to public network 104. Private network 102 could also forward messages for certain subscribers to public network 104 but not for other subscribers, and/or private network 102 could forward messages having a higher level of importance to public network 104 without forwarding other types of messages.

In another aspect of operation, mobile station 106 may produce messages for delivery to another mobile station 106 communicating with private network 102, application 108, public network 104, or another component of system 100. These are mobile-originated messages. When private network 102 receives a mobile-originated message, private network 102 attempts to deliver the message to the destination. Private network 102 may deliver the message to its destination, such as application 108 or another mobile station 106 in private network 102, without routing the message through public network 104. Private network 102 may also route the messages to public network 104 if the destination is outside private network 102. In one embodiment, private network 102 may attempt to deliver the message to its destination without routing the message through public network 104. Private network 102 could further discard the message when the mobile station 106 is not authorized to send the message or the destination is not authorized to receive the message.

The messages communicated in system 100 may comprise any suitable message. In one embodiment, the messages communicated to and/or from mobile station 106 comprise short messages supported by the GSM Short Message Service. In another embodiment, multiple message formats may be supported in system 100. For example, mobile station 106 could support the GSM Short Message Service protocols, messages from application 108 could use a Mobility Management over Internet Protocol (MMIP) protocol, messages indicating that voice mail device 110 has received a voice message could use the International Telecommunications Union-Telecommunications (ITU-T) H.450.7 protocol, and private network 102 and public network 104 could communicate using the GSM Mobility Application Part (MAP) protocols. In this embodiment, private network 102 and/or public network 104 may perform interworking functions to translate between the different protocols.

Although FIG. 1 illustrates one embodiment of system 100, other embodiments of system 100 may be used without departing from the scope of the present invention. For example, any number of private networks 102 and/or public networks 104 may be used in system 100. Also, any number and/or types of applications 108 may be used in system 100, and these applications 108 may generate any suitable user notification message for mobile station 106.

Figure 2:
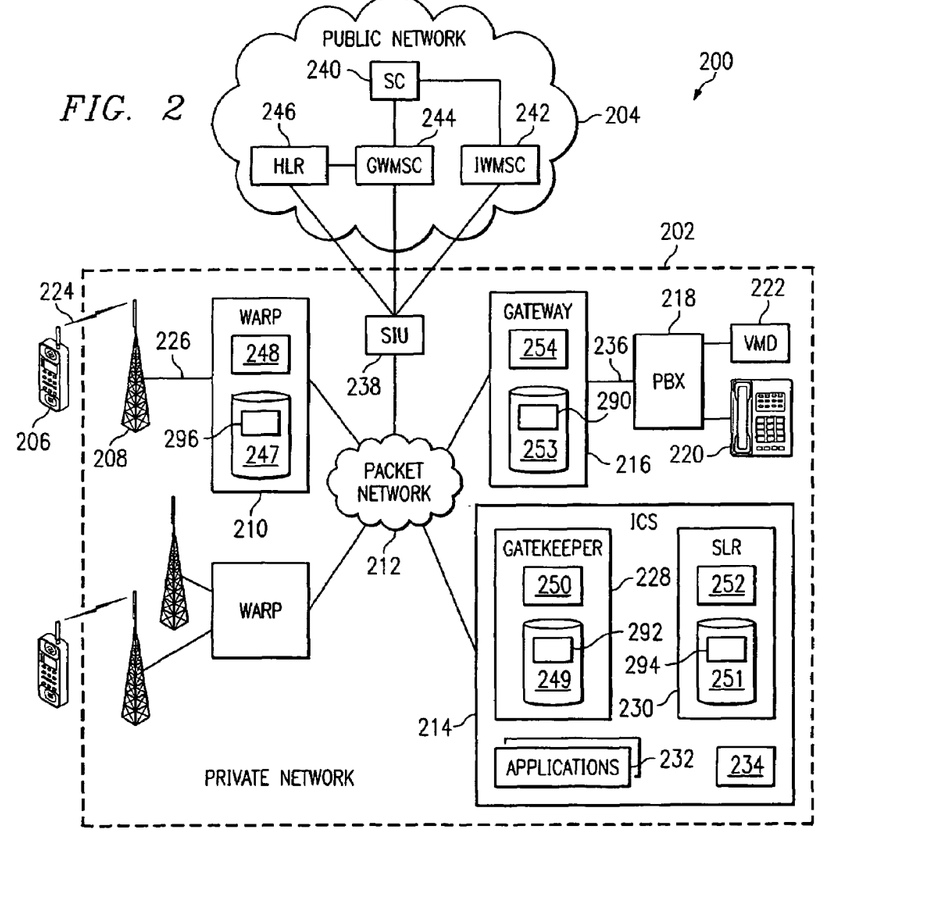
FIG. 2 is a block diagram illustrating details of one embodiment of the communication system of FIG. 1 in accordance with the present invention.

FIG. 2 is a block diagram illustrating details of one embodiment of the communication system of FIG. 1 in accordance with the present invention. In the illustrated embodiment, system 200 includes a private network 202 and a public network 204. Private network 202 includes a mobile station 206, a base station (BTS) 208, a Wireless Adjunct Internet Platform (WARP) 210, a packet network 212, an integrated communications server 214, a gateway 216, and a Private Branch Exchange (PBX) 218. Other embodiments of system 200 may be used without departing from the scope of the present invention.

In one aspect of operation, mobile station 206 receives user notification messages from private network 202. The user notification messages may, for example, be initiated by an application 232 executing on integrated communications server 214. The user notification messages may also indicate that a voice mail device 222 has received a voice message for a telephone 220 associated with mobile station 206. Private network 202 may communicate the notification message to mobile station 206 without routing the message through public network 204. If private network 202 cannot deliver the message to mobile station 206, private network 202 may or may not communicate the message to public network 204 for delivery to mobile station 206.

Mobile station 206 provides voice and/or data services to a subscriber of private network 202. Mobile station 206 communicates with private network 202 over a wireless interface 224. Mobile station 206 may comprise any wireless device operable to communicate with and roam within private network 202. Mobile station 206 may, for example, comprise a mobile telephone or a computer coupled to a wireless modem or radio unit. In one embodiment, mobile station 206 comprises a dual mode mobile station operable to communicate with private network 202 using a first protocol and with public network 204 using a second protocol. In a particular embodiment, mobile station 206 communicates with private network 202 using GSM protocols and with public network 204 using Electronic Industries Alliance/Telecommunication Industry Association (ELA/TIA) IS-136 protocols, and mobile station 206 comprises a dual mode GSM/IS-136 mobile handset. Other embodiments of mobile station 206 may be used without departing from the scope of the present invention.

Base station 208 is coupled to WARP 210. Base station 208 provides bi-directional communication with mobile stations 206 in a specified geographic area over wireless interface 224. Base station 208 also transfers information between mobile station 206 and WARP 210. Base station 208 may comprise any hardware, software, firmware, or combination thereof operable to communicate with mobile stations 206 over a wireless interface 224. Base station 208 may, for example, comprise one or more transceivers operable to exchange circuit-switched and/or packet-switched information with mobile station 206.

Wireless interface 224 facilitates communication between mobile station 206 and base station 208. Wireless interface 224 may comprise any wireless interface operable to transfer circuit-switched and/or packet-switched information between mobile station 206 and base station 208. Interface 224 may, for example, comprise a GSM General Packet Radio Service (GSM/GPRS) interface or a GSM Enhanced Data rates for GSM Evolution (GSM/EDGE) interface.

WARP 210 is coupled to base station 208 by an interface 226 and to packet network 212. WARP 210 facilitates communication between mobile stations 206 and packet network 212 by transporting voice and/or data information between base station 208 and packet network 212. WARP 210 may be referred to as a "wireless platform" because it supports communication between wireless devices such as mobile station 206 and system 200. In one embodiment, WARP 210 communicates with mobile station 206 through base station 208 using a circuit-switched protocol, and WARP 210 communicates with packet network 212 using a packet-switched protocol. In this embodiment, WARP 210 also performs an interworking function to translate between the circuit-switched and packet-switched protocols. For example, WARP 210 may convert between the GSM protocols used by mobile station 206 and the ITU-T H.323 protocols used by integrated communications server 214 and gateway 216. WARP 210 further packetizes information from mobile station 206 into datagrams for transmission over packet network 212, and WARP 210 depacketizes information contained in datagrams received over packet network 212.

In addition, WARP 210 facilitates communication of user notification messages to and from mobile station 206. WARP 210 may, for example, receive a user notification message from a component in private network 202, such as integrated communications server 214, and attempt to communicate the message to mobile station 206. If mobile station 206 acknowledges receipt of the message, WARP 210 may not communicate the message to public network 204. If mobile station 206 fails to acknowledge receipt of the message, WARP 210 may communicate the message to public network 204, and public network 204 may attempt to deliver the message to mobile station 206. WARP 210 may further receive a message from mobile station 206 and attempt to communicate the message to the destination. WARP 210 may comprise any hardware, software, firmware, or combination thereof operable to communicate user notification messages to and/or receive messages from mobile station 206. In the illustrated embodiment, WARP 210 includes a memory 247 and a processor 248. Memory 247 may comprise any suitable hardware, software, firmware, or combination thereof operable to store and facilitate retrieval of information. For example, memory 247 may store software instructions 296 executed by processor 248 to perform the described functions of WARP 210. Memory 247 may also store other information, such as the information being communicated to mobile station 206 from application 232.

In one embodiment, WARP 210 communicates the notification messages to mobile station 206 using GSM Short Message Service short messages. For example, WARP 210 may encapsulate the user notification message into a GSM mobile-terminated message and communicate the mobile-terminated message to one or more base stations 208. If mobile station 206 fails to acknowledge receipt of the mobile-terminated message, WARP 210 may encapsulate the user notification message into a GSM mobile-originated message and communicate the mobile-originated message to public network 204.

Interface 226 is coupled to base station 208 and WARP 210. Interface 226 may comprise any interface operable to transfer circuit-switched and/or packet-switched information between base station 208 and WARP 210. Interface 226 may, for example, comprise a GSM Abis wireline interface.

Packet network 212 is coupled to WARP 210, integrated communications server 214, and gateway 216. Packet network 212 transports datagrams, such as Internet Protocol (IP) packets, from one network address in packet network 212 to another network address. In addition, packet network 212 may be coupled to and communicate with one or more public networks 204, such as the Internet or a public land mobile network. Packet network 212 may comprise any packet-switched network. Packet network 212 may, for example, comprise a Local Area Network (LAN), a Wide Area Network (WAN), a Metropolitan Area Network (MAN), a portion of a global computer network such as the Internet, or any other communications system or systems at one or more locations.

In the illustrated embodiment, integrated communications server 214 includes a gatekeeper 228, a subscriber location register (SLR) 230, and one or more applications 232. Although FIG. 2 illustrates integrated communications server 214 as comprising all three of these components, any or all of these components may be implemented on a separate platform or platforms without departing from the scope of the present invention.

Gatekeeper 228 provides call control services for mobile stations 206, WARPs 210, and gateway 216. For example, gatekeeper 228 tracks the location of mobile stations 206, and gatekeeper 228 routes calls and messages for a mobile station 206 to and from the WARP 210 currently serving that mobile station 206. This allows subscribers using mobile stations 206 to roam between geographic areas covered by different base stations 208. Gatekeeper 228 also performs address translation to convert the phone number associated with mobile station 206 to a network address of WARP 210 serving that mobile station 206.

In addition, gatekeeper 228 may receive an indication from voice mail device 222 that a voice message has been received for a telephone 220 associated with mobile station 206. Gatekeeper 228 and/or gateway 216 may generate a user notification message for mobile station 206 informing the subscriber of the voice message, and gatekeeper 228 routes the notification message to the WARP 210 that is serving mobile station 206. Gatekeeper 228 may comprise any hardware, software, firmware, or combination thereof operable to provide call control services and facilitate delivery of user notification messages to mobile station 206. In the illustrated embodiment, gatekeeper 228 includes a memory 249 and a processor 250. Memory 249 may store software instructions 292 executed by processor 250 to perform the described functions of gatekeeper 228.

Subscriber location register 230 stores subscriber management information for mobile stations 206. For example, subscriber location register 230 may store general subscriber management information downloaded from public network 204 when mobile station 206 roams into system 200. Subscriber location register 230 may also store each subscriber's extension number, direct dial number, and any other information that is specific to private network 202. As used herein, "each" means every one of at least a subset of the identified items.

Subscriber location register 230 may further store an indication of whether a subscriber using a mobile station 206 is authorized to communicate and/or receive user notification messages. In addition, subscriber location register 230 may store an identification of a default WARP 210 to which user notification messages will be sent if no other WARP 210 is currently serving a mobile station 206. Subscriber location register 230 may comprise any hardware, software, firmware, or combination thereof operable to store subscriber management information. Subscriber location register 230 may, for example, comprise a SUN workstation with a database. In the illustrated embodiment, subscriber location register 230 includes a memory 251 and a processor 252. Memory 251 may store software instructions 294 executed by processor 252 to perform the described function of subscriber location register 230.

Application 232 represents one or more applications that may generate and/or communicate user notification messages to a mobile station 206. In one embodiment, applications 232 represent software applications operable to be executed by a processor 234. Applications 232 may, for example, include a calendar and electronic mail program, such as MICROSOFT OUTLOOK or OUTLOOK EXPRESS. Applications 232 may also include a Web-based interface to integrated communications server 214 through which one subscriber can provide a message for another subscriber. The user notification messages may comprise a message reminding a subscriber of an appointment, a message indicating that e-mail has arrived, or a message entered through the Web-based interface. Other applications 232 and/or user notification messages may be used without departing from the scope of the present invention.

In one embodiment, private network 202 is operable to assign a user identifier to a first mobile station identifier corresponding to a first mobile station 206. According to one embodiment, private network 202 is operable to store the assignment of the user identifier to the first mobile station identifier in subscriber location register 230. It will be understood, however, that private network 202 may otherwise suitably store the assignment without departing from the scope of the present invention. Private network 202 is then operable to receive a first message with the user identifier from an application 232 and to deliver the first message to the first mobile station 206 based on the assignment of the user identifier to the first mobile station identifier.

Private network 202 is also operable to update the assignment of the same user identifier to a second mobile station identifier corresponding to a second mobile station 206. The second mobile station 206 may comprise the first mobile station 206 when a mobile station identifier for a same mobile station 206 changes to a different mobile station identifier. According to one embodiment, private network 202 is operable to store the assignment of the user identifier to the second mobile station identifier in subscriber location register 230. Private network 202 is then operable to receive a second message with the user identifier from an application 232 and to deliver the second message to the second mobile station 206 based on the assignment of the user identifier to the second mobile station identifier.

Thus, the assignment of the user identifier to a mobile station identifier may be updated at any suitable time. This allows a user to receive messages directed to his or her user identifier at any suitable mobile station 206 without requiring the sender to have knowledge of the mobile station identifier for the mobile station 206 at which the user prefers to receive messages.

Gateway 216 is coupled to packet network 212 and PBX 218. Gateway 216 may also be coupled to a public network, such as a public switched telephone network. Gateway 216 transfers information between packet network 212 and PBX 218. In one embodiment, gateway 216 communicates with packet network 212 using a packet-switched protocol and with PBX 218 using a circuit-switched protocol. In this embodiment, gateway 216 also performs an interworking function to translate between the packet-switched and circuit-switch protocols. In a particular embodiment, gateway 216 converts between the ITU-T H.323 protocols used by WARP 210 and integrated communications server 214 and the circuit-switched protocols used by PBX 218. In addition, gateway 216 packetizes information into datagrams for transmission over packet network 212, and gateway 216 depacketizes information contained in datagrams received over packet network 212. Gateway 216 may communicate bearer and signaling information to PBX 218 over an interface 236. Gateway 216 may comprise any hardware, software, firmware, or combination thereof operable to facilitate communication between packet network 212 and PBX 218. In the illustrated embodiment, gateway 216 includes a memory 253 and a processor 254. Memory 253 may store software instructions 290 executed by processor 254 to perform the described functions of gateway 216.

PBX 218 is coupled to gateway 216, one or more telephones 220, and one or more voice mail devices 222. PBX 218 may also be coupled to one or more public networks, such as a public land mobile network and a public switched telephone network. PBX 218 transfers information between telephones 220 and/or between gateway 216 and telephones 220. PBX 218 may comprise any circuit-switched and/or packet-switched network operable to facilitate communication between telephone 220, voice mail device 222, and gateway 216.

Gateway 216 and PBX 218 communicate over an interface 236. Interface 236 may comprise any wireless or wireline interface operable to facilitate communication between gateway 216 and PBX 218. Interface 236 may, for example, comprise one or more trunk interfaces or one or more line interfaces.

Telephone 220 is coupled to PBX 218. Telephone 220 may comprise any wireline or wireless telephonic device operable to communicate with PBX 218. In this document, the phrase "telephonic device" refers to any hardware, software, firmware, or combination thereof operable to provide voice phone services. Telephone 220 may, for example, comprise a fixed telephone, a wireless mobile station, a voice over packet telephone, or a computer executing a telephonic application.

Voice mail device 222 is coupled to PBX 218. Voice mail device 222 is operable to receive and store voice messages associated with a telephone 220. In one embodiment, voice mail device 222 is also operable to inform gatekeeper 228 and/or gateway 216 that a telephone 220 associated with a mobile station 206 has received a voice message. Gatekeeper 228 and/or gateway 216 may then produce a user notification message informing mobile station 206 that a voice message has been received, and gatekeeper 228 may route the message to WARP 210 serving that mobile station 206. Voice mail device 222 may comprise any hardware, software, firmware, or combination thereof operable to store voice messages. Although FIG. 2 illustrates telephone 220 and voice mail device 222 as separate components, telephone 220 and voice mail device 222 could also be combined into a single physical unit.

In one embodiment, private network 202 and public network 204 may use different communications protocols. To facilitate communication between private network 202 and public network 204, a Signaling System 7-Internet Protocol Interworking Unit (SIU) 238 is coupled to packet network 212 and to public network 204. SS7-IP interworking unit 238 allows private network 202 to communicate and exchange signaling messages with public network 204. In a particular embodiment, SS7-IP interworking unit 238 depacketizes messages contained in data packets received over packet network 212 and generates Signaling System 7 (SS7) Message Transfer Part (MTP) messages used by public network 204. SS7-IP interworking unit 238 also packetizes messages contained in SS7 MTP messages into data packets for transmission over packet network 212. In addition, SS7-IP interworking unit 238 may perform a routing function to route datagrams through packet network 212. SS7-IP interworking unit 238 may comprise any hardware, software, firmware, or combination thereof operable to facilitate communication between packet network 212 and public network 204.

In the illustrated embodiment, public network 204 includes a Short Message Service service center (SC) 240, an interworking mobile switching center (IWMSC) 242, a gateway mobile switching center (GWMSC) 244, and a home location register (HIR) 246. Although FIG. 2 illustrates the components of public network 204 as residing on separate platforms, one or more of these components may be combined into a single platform without departing from the scope of the present invention.

Service center 240 is operable to control the delivery of messages to mobile stations 206 in public network 204. For example, service center 240 may receive a message for a first mobile station 206 from private network 202 or from a second mobile station 206, and service center 240 routes the message to the first mobile station 206. In one embodiment, service center 240 is operable to control the delivery of GSM Short Message Service messages. Service center 240 may comprise any hardware, software, firmware, or combination thereof operable to manage the delivery of messages to mobile stations 206.

Interworking mobile switching center 242 is coupled to SS7-IP interworking unit 238 and service center 240. In one embodiment, interworking mobile switching center 242 is coupled to SS7-IP interworking unit 238 using a GSM MAP/H link. Interworking mobile switching center 242 receives messages to be communicated to a mobile station 206 from private network 202 or another mobile station 206. In one embodiment, interworking mobile switching center 242 and service center 240 may communicate using proprietary protocols, and interworking mobile switching center 242 also performs an interworking function to convert between the protocol used by SS7-IP interworking unit 238 and the protocol used by service center 240. In one embodiment, interworking mobile switching center 242 converts between the GSM MAP protocol used by SS7-IP interworking unit 238 and the proprietary protocol used by service center 240. Interworking mobile switching center 242 may comprise any hardware, software, firmware, or combination thereof operable to interwork messages between SS7-IP interworking unit 238 and service center 240.

Gateway mobile switching center 244 is coupled to SS7-IP interworking unit 238, service center 240, and home location register 246. Gateway mobile switching center 244 could also be coupled to another public network, such as another public land mobile network. In one embodiment, gateway mobile switching center 244 is coupled to SS7-IP interworking unit 238 using a GSM MAP/H link and to home location register 246 using a GSM MAP/C link. Gateway mobile switching center 244 receives messages to be communicated to a mobile station 206 from service center 240. In one embodiment, gateway mobile switching center 244 and service center 240 communicate using proprietary protocols, and gateway mobile switching center 244 also performs an interworking function to convert between the protocol used by SS7-IP interworking unit 238, such as the GSM MAP protocol, and the protocol used by service center 240. Gateway mobile switching center 244 may comprise any hardware, software, firmware, or combination thereof operable to interwork messages between SS7-IP interworking unit 238 and service center 240.

Home location register 246 is coupled to SS7-IP interworking unit 238 and gateway mobile switching center 244. In one embodiment, home location register 246 is coupled to SS7-IP interworking unit 238 by a GSM MAP/C and/or MAP/D link. Home location register 246 handles location management functions for public network 204, storing the location of a mobile station 206. When mobile station 206 moves into private network 202, home location register 246 stores which WARP 210 is currently serving mobile station 206. If mobile station 206 roams between two WARPs 210, home location register 246 updates the location of mobile station 206. When mobile station 206 leaves private network 202, home location register 246 stores the location of mobile station 206 within public network 204. Home location register 246 also transfers general subscriber management information to subscriber location register 230 when a mobile station 206 registers with a WARP 210. Home location register 246 may comprise any hardware, software, firmware, or combination thereof operable to store subscriber management information. Home location register 246 may, for example, comprise a SUN workstation with a database.

In one aspect of operation, a subscriber using mobile station 206 may receive user notification messages from private network 202 and/or public network 204. Mobile station 206 may, for example, receive a message from an application 232. When an application 232 generates a message for mobile station 206, integrated communications server 214 communicates the message to WARP 210 serving the mobile station 206. In one embodiment, integrated communications server 214 communicates an MMIP message to WARP 210, and the MMIP message contains the text of the message being sent to mobile station 206. The MMIP message may also contain one or more flags, which can be used by WARP 210 to determine whether to forward the message to public network 204 if WARP 210 cannot successfully deliver the message to mobile station 206. When WARP 210 receives the message from integrated communications server 214, WARP 210 may acknowledge receipt of the message. WARP 210 also determines which base station 208 coupled to WARP 210 is communicating with mobile station 206. WARP 210 generates a mobile-terminated message for mobile station 206, and the mobile-terminated message contains the text of the message being sent to mobile station 206. In one embodiment, WARP 210 generates a GSM mobile-terminated short message. WARP 210 then communicates the mobile-terminated message to base station 208, and base station 208 communicates the message to mobile station 206.

If mobile station 206 acknowledges receipt of the message, WARP 210 may inform integrated communications server 214 of the delivery, or WARP 210 may take no further action. If mobile station 206 fails to acknowledge receipt of the message, WARP 210 may examine the flag in the message received from integrated communications server 214. When the flag indicates that WARP 210 may forward the message to public network 204, WARP 210 generates a mobile-originated message containing the text of the message from integrated communications server 214. In one embodiment, WARP 210 generates a GSM mobile-originated short message. WARP 210 then communicates the mobile-originated message to interworking mobile switching center 242, and switching center 240 in public network 204 attempts to deliver the message to mobile station 206.

Mobile station 206 may also receive a message indicating that voice mail device 222 has received a voice message for a telephone 220 associated with mobile station 206. When voice mail device 222 receives a voice message, gatekeeper 228 and/or gateway 216 detects the receipt of the message and generates a signal for WARP 210 informing WARP 210 of the voice message. In a particular embodiment, gatekeeper 228 and/or gateway 216 generates an ITU-T H.450 Message Waiting Indicator (MWI) message. The MWI message may include an "activate" or "deactivate" value. The activate value indicates that one or more voice messages have been received by voice mail device 222, and the deactivate value indicates that there are no longer any voice messages waiting for the subscriber. The MWI message may also include other or additional information, such as the number of voice messages waiting for the subscriber, the address or phone number of the caller who left the voice message, the time the voice message was received, and the priority of the voice message.

When WARP 210 receives the MWI message, WARP 210 sends an MMIP message to subscriber location register 230, informing subscriber location register 230 of the activation or deactivation status of the voice mail device 222. Subscriber location register 230 determines whether a user notification message should be sent to mobile station 206. In one embodiment, subscriber location register 230 determines whether a subscriber is authorized to receive this type of message. Subscriber location register 230 may also determine whether the subscriber's subscription allows the subscriber to receive an indication for every new voice message, or whether the subscriber may receive an indication only when the first new voice message is received after the subscriber checks the messages and not when subsequent new messages are received. Using this information, subscriber location register 230 instructs WARP 210 to generate or not generate a message for mobile station 206.

If instructed to produce the notification message, WARP 210 may generate a mobile-terminated message containing an indication that a voice message has arrived, and the message may contain any of the other or additional information from the MWI message received from gatekeeper 228 and/or gateway 216. WARP 210 communicates the mobile-terminated message to mobile station 206. WARP 210 may also generate and communicate a mobile-originated message to public network 204 if mobile station 206 fails to acknowledge receipt of the mobile-terminated message.

Mobile station 206 may further receive a message from public network 204. For example, public network 204 may be operable to store voice messages for calls placed to mobile station 206, and public network 204 may generate messages when a voice message is received for mobile station 206. WARP 210 receives the message through SS7-IP interworking unit 238, and WARP 210 communicates the message to mobile station 206.

In addition, mobile station 206 may generate a mobile-originated message for communication to another component of private network 202 or public network 204. If the message is destined for application 232, gatekeeper 228, or gateway 216, WARP 210 may generate and communicate an MMIP message containing the text of the message from mobile station 206. If the message is destined for public network 204, WARP 210 may generate and communicate GSM MAP message containing the text of the message from mobile station 206.

When a user notification message has been generated for a mobile station 206 that is not registered with private network 202, the message could be routed to a default WARP 210 stored in subscriber location register 230. When WARP 210 receives the message, WARP 210 could immediately forward the message to public network 204. WARP 210 could also attempt to deliver the message to mobile station 206, even though mobile station 206 was not registered with private network 202 when the message was generated.

Although FIG. 2 illustrates one embodiment of system 200, various changes may be made to system 200 without departing from the scope of the present invention. For example, any number of base stations 208 may be coupled to each WARP 210, and any number of WARPs 210 may be coupled to packet network 212. Also, although FIG. 2 illustrates a PBX 218 coupled to gateway 216, other telephone systems may be coupled to gateway 218, such as a Key System, a central office switch, a wireless telephone switch, a packet-based soft switch, or any other circuit-switched and/or packet-switched system. Further, although integrated communications server 214 and gateway 216 are illustrated as separate entities, both may be implemented in an integrated platform. In addition, messages for mobile station 206 may be produced by an electronic mail server or other computing device in system 200 and communicated to integrated communications server 214 or WARP 210. Beyond that, FIG. 2 illustrates WARP 210, gateway 216, gatekeeper 228, and subscriber location register 230 as containing a memory and a processor. In another embodiment, the functions of one or more of these components may be incorporated into logic encoded on at least one computer-processable medium. The logic may be encoded in hardware, software instructions, and/or firmware instructions stored in any suitable device such as, for example, a random access memory (RAM), a read-only memory (ROM), an application-specific integrated circuit (ASIC), or a field programmable gate array (FPGA). Other changes may be made to system 200 without departing from the scope of the present invention.

Figure 3:
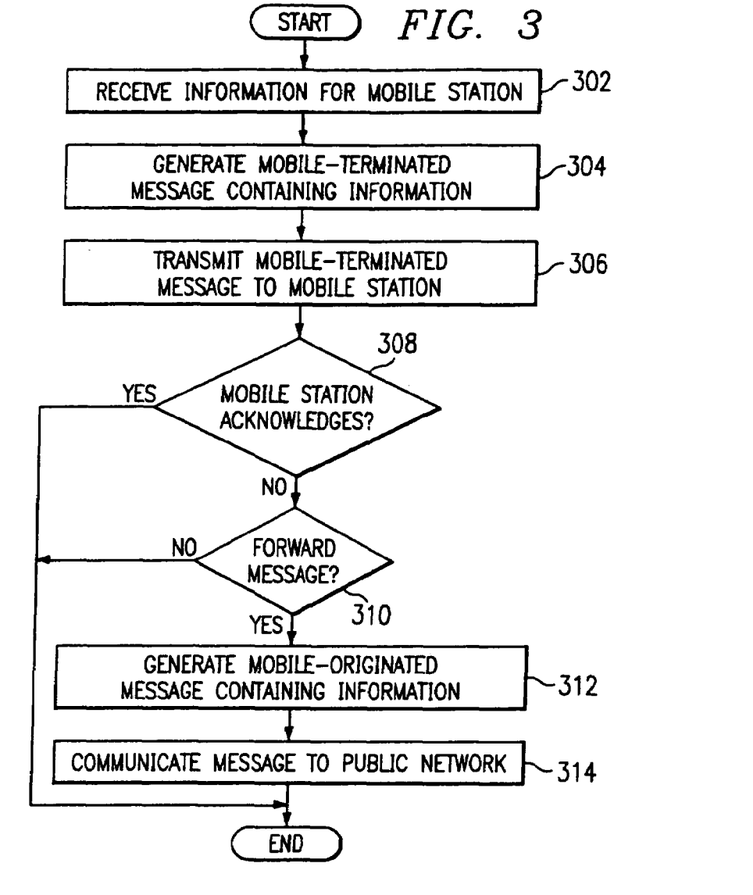
FIG. 3 is a flow diagram illustrating a method for delivering a user notification message to a mobile station in accordance with one embodiment of the present invention.

FIG. 3 is a flow diagram illustrating a method for delivering a user notification message to a mobile station in accordance with one embodiment of the present invention. Although the method is described with regard to system 200, it will be understood that the same or a similar method may be used by system 100 or any other suitable communication system without departing from the scope of the present invention.

The method begins at step 302 where private network 202 receives information for a mobile station 206. This may include, for example, an application 232 generating or receiving the information, gatekeeper 228 and/or gateway 216 generating the information after voice mail device 222 receives a voice message, or public network 204 communicating the information to private network 202. At step 304, private network 202 generates a mobile-terminated message containing the information. This may include, for example, WARP 210 generating a GSM SMS mobile-terminated message containing the information. At step 306, private network 202 communicates the mobile-terminated message to mobile station 206. This may include, for example, WARP 210 communicating the mobile-terminated message to base station 208, and base station 208 communicating the message to mobile station 206 over wireless interface 224.

At step 308, private network 202 determines whether mobile station 206 acknowledges successful receipt of the mobile-terminated message. This may include, for example, WARP 210 determining whether mobile station 206 communicates an acknowledgement message to WARP 210 over wireless interface 224. If mobile station 206 acknowledges successful receipt of the message, the method comes to an end. Otherwise, when mobile station 206 fails to acknowledge successful receipt of the mobile-terminated message, private network 202 determines whether to forward the information to public network 204 at step 310. This may include, for example, WARP 210 determining whether to forward the message based on a flag in the information received from application 232, gatekeeper 228, gateway 216, and/or subscriber location register 230.

If WARP 210 determines that it will not forward the message, the method comes to an end. Otherwise, private network 202 generates a mobile-originated message containing the information at step 312. This may include, for example, WARP 210 generating a GSM SMS mobile-originated message. At step 314, private network 202 communicates the mobile-originated message to public network 204. This may include, for example, WARP 210 communicating the message to service center 240 through SS7-IP interworking unit 238 and interworking mobile switching center 242. Service center 240 may then attempt to deliver the message to mobile station 206 through public network 204.

Although FIG. 3 illustrates one example of a method for delivering a user notification message to mobile station 206, various changes may be made to the method without departing from the scope of the present invention. For example, private network 202 may forward all unsuccessfully delivered messages to public network 204, skipping step 310. Also, private network 202 could make multiple attempts to deliver the mobile-terminated message to mobile station 206, repeating steps 306 and/or 308. Other changes may be made to the method without departing from the scope of the present invention.

Figure 4:
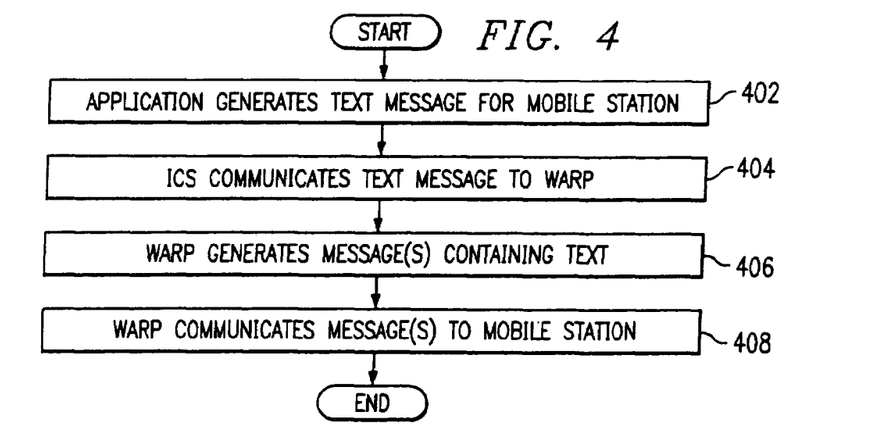
FIG. 4 is a flow diagram illustrating a method for delivering a text message from an application to a mobile station in accordance with one embodiment of the present invention.

FIG. 4 is a flow diagram illustrating a method for delivering a text message from an application to a mobile station in accordance with one embodiment of the present invention. Although the method is described with regard to system 200, it will be understood that the same or a similar method may be used by system 100 or any other suitable communication system without departing from the scope of the present invention.

The method begins at step 402 where an application 232 generates a text message for mobile station 206. This may include, for example, a calendar or task program generating a reminder message, an electronic mail program generating a "message received" message, or a subscriber entering the text message through a Web-based interface. At step 404, integrated communications server 214 communicates the text message to WARP 210. This may include, for example, integrated communications server 214 encapsulating the text message into an MMIP message and communicating the MMIP message to WARP 210 over packet network 212. At step 406, WARP 210 generates one or more messages for mobile station 208. This may include, for example, WARP 210 extracting the text message from the MMIP message and encapsulating the text message into a GSM SMS mobile-terminated message and/or a mobile-originated message. At step 408, WARP 210 communicates the message to mobile station 206. This may include, for example, WARP 210 communicating the mobile-terminated message to mobile station 206 through base station 208, and/or WARP 210 communicating the mobile-originated message to mobile station 206 through public network 204.

Figure 5A:
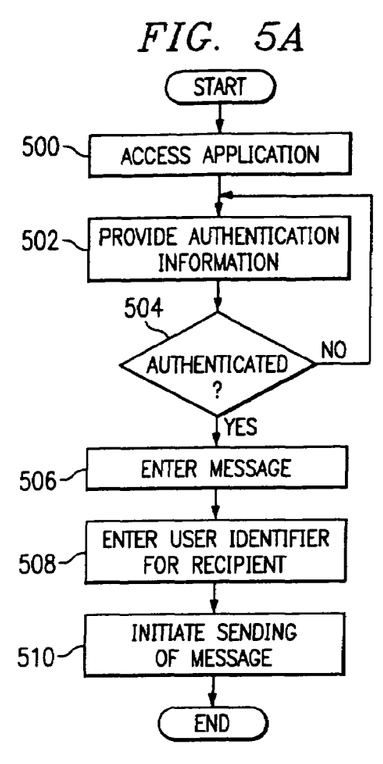
FIGS. 5A-B are flow diagrams illustrating a method for generating a user notification message to be delivered to a mobile station in accordance with one embodiment of the present invention.

FIG. 5A is a flow diagram illustrating a method for generating a user notification message to be delivered to a mobile station 206 from the perspective of a sender of the message in accordance with one embodiment of the present invention. Although the method is described with regard to system 200, it will be understood that the same or a similar method may be used by system 100 or any other suitable communication system without departing from the scope of the present invention.

The method begins at step 500 where a sender accesses an application 232. According to one embodiment, the application 232 comprises a Web-based interface through which the sender may access private network 202 to provide messages for delivery to a mobile station 206. It will be understood, however, that the application 232 may comprise any suitable application operable to generate a user notification message from a sender for a mobile station 206. At step 502, the sender provides authentication information. This authentication information may comprise a user name, a password and/or any other suitable identifying information operable to authenticate the sender.

At decisional step 504, a determination is made regarding whether the sender has been authenticated by private network 202. According to one embodiment, the sender may be authenticated based on a service profile for the sender stored in subscriber location register 230. However, it will be understood that the sender may be otherwise suitably authenticated without departing from the scope of the present invention. If the sender has not been authenticated, the method follows the No branch from decisional step 504 and returns to step 502 where the sender again provides authentication information. It will be understood that a number of authentication attempts may be tracked for security purposes. For example, if a sender has been determined to be not authenticated after a specified number of attempts, the sender may be locked out from further attempts, bringing the method to an end.

If the sender has been authenticated in decisional step 504, the method follows the Yes branch from decisional step 504 to step 506. At step 506, the sender enters the message to be sent. According to one embodiment, the message comprises a subject section, a content section and/or any other suitable section.

At step 508, the sender enters a user identifier for each recipient of the message. The sender may enter the user identifier by selecting from a list of user identifiers and/or groups of user identifiers, by typing in a user identifier and/or a group identifier, and/or by any other suitable process. At step 510, the sender initiates the sending of the message to the recipients, at which point the method comes to an end. According to one embodiment, the sender initiates the sending of the message by choosing a "send message" option in the application 232.

Figure 5B:
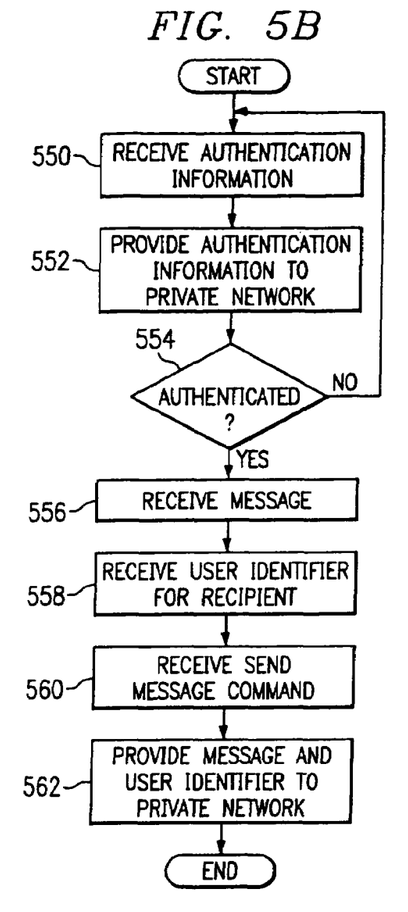

FIG. 5B is a flow diagram illustrating a method for generating a user notification message to be delivered to a mobile station 206 from the perspective of an application 232 in accordance with one embodiment of the present invention. According to one embodiment, the application 232 comprises a Web-based interface through which the sender may access private network 202 to provide messages for delivery to a mobile station 206. It will be understood, however, that the application 232 may comprise any suitable application operable to generate a user notification message from a sender for a mobile station 206. In addition, although the method is described with regard to system 200, it will be understood that the same or a similar method may be used by system 100 or any other suitable communication system without departing from the scope of the present invention.

The method begins at step 550 where the application 232 receives authentication information from the sender. This authentication information may comprise a user name, a password and/or any other suitable identifying information operable to authenticate the sender. At step 552, the application 232 provides the authentication information to private network 202 for authentication of the sender.

At decisional step 554, a determination is made regarding whether the sender has been authenticated by private network 202. According to one embodiment, the sender may be authenticated based on a service profile for the sender stored in subscriber location register 230. However, it will be understood that the sender may be otherwise suitably authenticated without departing from the scope of the present invention. In addition, when the sender is authenticated, the application 232 may receive a confirmation of the authentication from private network 202. However, it will be understood that the application 232 may otherwise suitably determine whether the sender has been authenticated without departing from the scope of the present invention.

If the sender has not been authenticated, the method follows the No branch from decisional step 554 and returns to step 550 where the application 232 again receives authentication information from the sender. It will be understood that a number of authentication attempts may be tracked for security purposes. For example, if a sender has been determined to be not authenticated after a specified number of attempts, the sender may be locked out from further attempts, bringing the method to an end.

If the sender has been authenticated in decisional step 554, the method follows the Yes branch from decisional step 554 to step 556. At step 556, the application 232 receives the message to be sent from the sender. According to one embodiment, the message comprises a subject section, a content section and/or any other suitable section.

At step 558, the application 232 receives a user identifier for each recipient of the message from the sender. According to one embodiment, the application 232 may provide a list of valid user identifiers and/or groups of user identifiers from which the sender may select user identifiers. However, it will be understood that the application 232 may otherwise suitably receive the user identifiers from the sender without departing from the scope of the present invention.

At step 560, the application 232 receives a "send message" command from the sender. According to one embodiment, the application 232 provides a "send message" option for selection by the sender when the message and user identifiers are satisfactory to the sender. At step 562, the application 232 provides the message and user identifiers to private network 202 which is operable to transmit the message to the appropriate mobile stations 206. According to one embodiment, private network 202 transmits the message according to the method of FIG. 6. In this way, a sender may send a message to a user through the user's mobile station 206 based on an easily remembered identifier for the user rather than based on a mobile station identifier. Thus, the sender need not have knowledge of the mobile station identifier. In addition, the user identifier may be updated to correspond to any suitable mobile station 206 at any suitable time without affecting the sender's ability to send a message to the user.

Figure 6:
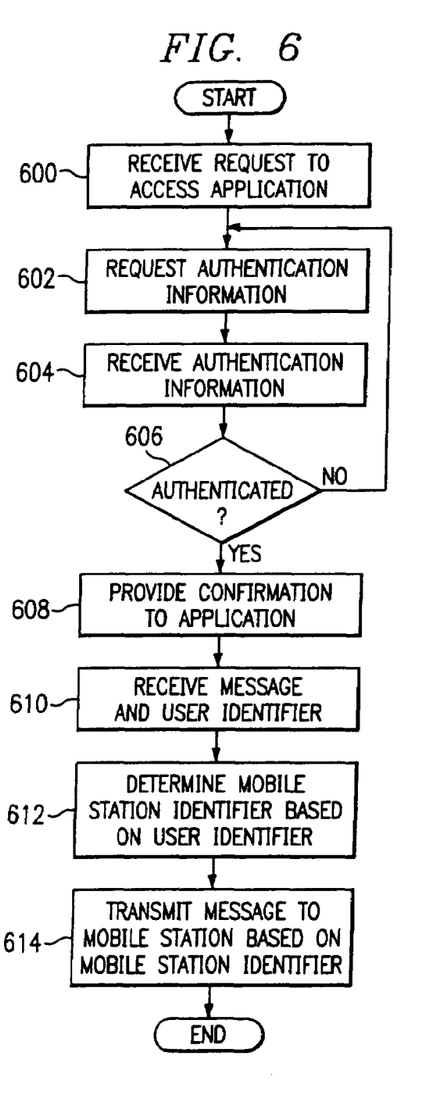
FIG. 6 is a flow diagram illustrating a method for transmitting a user notification message to a mobile station based on a user identifier in accordance with one embodiment of the present invention.

FIG. 6 is a flow diagram illustrating a method for transmitting a user notification message to a mobile station 206 based on a user identifier in accordance with one embodiment of the present invention. Although the method is described with regard to system 200, it will be understood that the same or a similar method may be used by system 100 or any other suitable communication system without departing from the scope of the present invention.

The method begins at step 600 where private network 202 receives a request from a sender to access an application 232. According to one embodiment, the application 232 comprises a Web-based interface through which the sender may access private network 202 to provide messages for delivery to a mobile station 206. It will be understood, however, that the application 232 may comprise any suitable application operable to generate a user notification message from a sender for a mobile station 206.

At step 602, private network 202 requests authentication information from the sender through the application 232. This authentication information may comprise a user name, a password and/or any other suitable identifying information operable to authenticate the sender. At step 604, private network 202 receives the authentication information from the sender through the application 232.

At decisional step 606, private network 202 makes a determination regarding whether the sender is authenticated. According to one embodiment, private network 202 authenticates the sender based on a service profile for the sender stored in subscriber location register 230. However, it will be understood that private network 202 may otherwise suitably authenticate the sender without departing from the scope of the present invention. If the sender is not authenticated, the method follows the No branch from decisional step 606 and returns to step 602 where private network 202 again requests authentication information from the sender. It will be understood that private network 202 may track a number of authentication attempts for security purposes. For example, if a sender has been determined to be not authenticated after a specified number of attempts, private network 202 may lock out the sender from further attempts, bringing the method to an end.

If the sender is authenticated in decisional step 606, the method follows the Yes branch from decisional step 606 to step 608. At step 608, private network 202 provides confirmation of the authentication of the sender to the application 232. At step 610, private network 202 receives from the sender a message and a user identifier for each recipient of the message through the application 232. According to one embodiment, the message comprises a subject section, a content section and/or any other suitable section.

At step 612, private network 202 determines a mobile station identifier based on each user identifier received from the sender. According to one embodiment, private network 202 determines the mobile station identifier based on information stored in subscriber location register 230 which assigns each valid user identifier to a particular mobile station identifier. As described above in connection with FIG. 2, the assignment of a user identifier to a mobile station identifier may be updated at any suitable time, thereby allowing a user to receive messages directed to his or her user identifier at any suitable mobile station 206 and without requiring the sender to have knowledge of the mobile station identifier for the mobile station 206 at which the user prefers to receive messages. According to one embodiment, described in FIG. 8 below, private network 202 stores user identifiers and corresponding mobile station identifiers in a table which may be stored in subscriber location register 230 or other suitable location.

At step 614, private network 202 transmits the message to the appropriate mobile station 206 based on the previously determined mobile station identifier, at which point the method comes to an end. For example, private network 202 may transmit the message to the mobile station 206 in accordance with the methods of FIGS. 3 and 4. However, it will be understood that the message may be transmitted to the mobile station 206 using any suitable method without departing from the scope of the present invention. In this way, a message may be transmitted to a mobile station 206 through private network 202 or through private network 202 and public network 204 based on a user identifier provided by the sender instead of based on a mobile station identifier provided by the sender.

Figure 7:
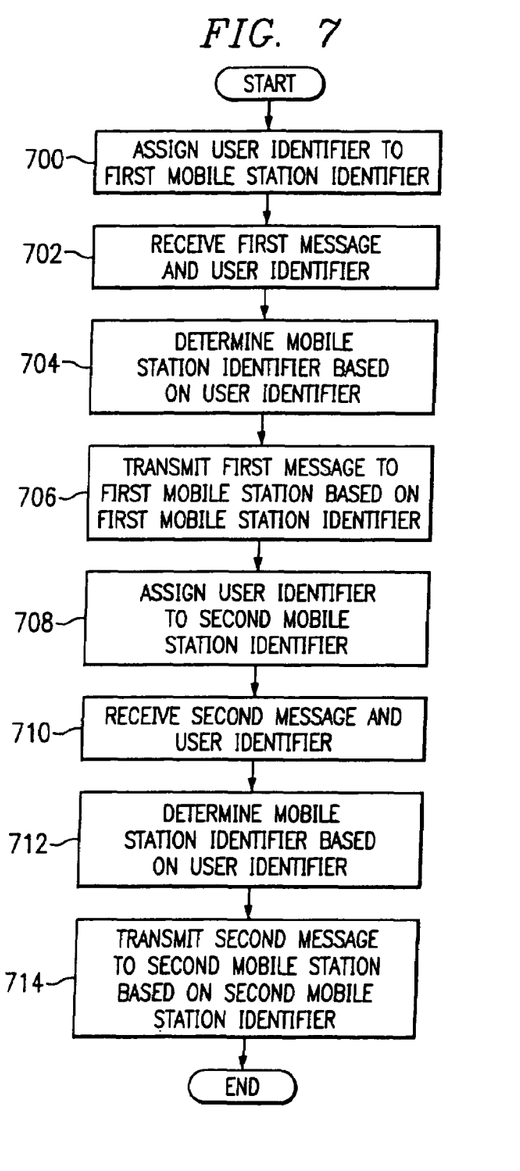
FIG. 7 is a flow diagram illustrating a method for providing message services for mobile stations in accordance with one embodiment of the present invention.

FIG. 7 is a flow diagram illustrating a method for providing message services for mobile stations 206 in accordance with one embodiment of the present invention. Although the method is described with regard to system 200, it will be understood that the same or a similar method may be used by system 100 or any other suitable communication system without departing from the scope of the present invention.

The method begins at step 700 where private network 202 assigns a user identifier to a first mobile station identifier corresponding to a first mobile station 206. The user identifier may comprise one or more of a user's first name, last name, nickname and/or other suitable identifier. The first mobile station 206 may comprise the user's mobile telephone, pager, or other suitable mobile device. The first mobile station identifier may comprise a telephone number, a pager number, or other suitable identifier operable to distinguish the first mobile station 206 from other mobile stations 206. According to one embodiment, private network 202 stores the assignment of the user identifier to the first mobile station identifier in subscriber location register 230.

At step 702, private network 202 receives a first message and the user identifier. At step 704, private network 202 determines a mobile station identifier for the message based on the user identifier. According to one embodiment, private network 202 determines the mobile station identifier based on the assignments of user identifiers to particular mobile station identifiers that are stored in subscriber location register 230. Thus, private network 202 determines that the mobile station identifier is the first mobile station identifier based on the current assignment of the user identifier to the first mobile station identifier.

At step 706, private network 202 transmits the first message to the first mobile station 206 based on the first mobile station identifier. For example, private network 202 may transmit the first message to the first mobile station 206 in accordance with the methods of FIGS. 3 and 4. However, it will be understood that the first message may be transmitted to the first mobile station 206 using any suitable method without departing from the scope of the present invention.

At step 708, private network 202 assigns the user identifier to a second mobile station identifier corresponding to a second mobile station 206. The second mobile station 206 may comprise the user's mobile telephone, pager, or other suitable mobile device, including the first mobile station 206. The second mobile station identifier may comprise a telephone number, a pager number, or other suitable identifier operable to distinguish the second mobile station 206 from other mobile stations 206. Thus, for example, if the first mobile station 206 comprises a cellular telephone and the first mobile station identifier comprises a telephone number for the cellular telephone, the second mobile station 206 may comprise the same cellular telephone and the second mobile station identifier may comprise a new, updated telephone number for the cellular telephone. Alternatively, the second mobile station 206 may comprise a different cellular telephone, and the second mobile station identifier may comprise a telephone number for the different cellular telephone. According to one embodiment, private network 202 stores the assignment of the user identifier to the second mobile station identifier in subscriber location register 230.

At step 710, private network 202 receives a second message and the user identifier. At step 712, private network 202 determines a mobile station identifier for the message based on the user identifier. Thus, private network 202 determines that the mobile station identifier is the second mobile station identifier based on the current assignment of the user identifier to the second mobile station identifier.

At step 714, private network 202 transmits the second message to the second mobile station 206 based on the second mobile station identifier. For example, private network 202 may transmit the second message to the second mobile station 206 in accordance with the methods of FIGS. 3 and 4. However, it will be understood that the second message may be transmitted to the second mobile station 206 using any suitable method without departing from the scope of the present invention.

In this way, a user may receive messages directed to his or her user identifier first at one mobile station 206 and then at another mobile station 206 without the sender having any knowledge as to the mobile station identifiers for the mobile stations 206. Similarly, a user may receive messages directed to his or her user identifier at a mobile station 206 having a first mobile station identifier and later having a second mobile station identifier without the sender having any knowledge of the change in mobile station identifiers.

Figure 8:
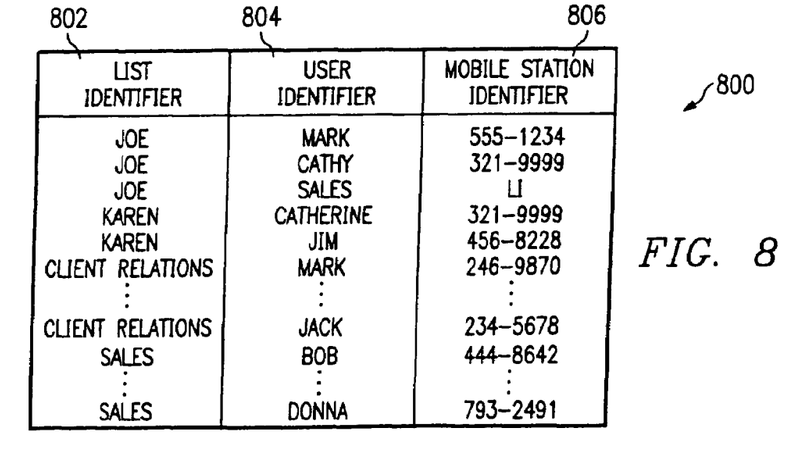
FIG. 8 is a table illustrating one embodiment of assignments of user identifiers to mobile station identifiers in accordance with one embodiment of the present invention.

FIG. 8 is a table 800 illustrating one embodiment of assignments of user identifiers to mobile station identifiers in accordance with one embodiment of the present invention. According to this embodiment, the table 800 comprises list identifiers 802 each operable to identify a particular list of possible message recipients, user identifiers 804 each operable to identify a particular user to whom messages may be sent as described above in connection with FIGS. 5-7, and mobile station identifiers 806 each operable to identify a particular mobile station 206 for the user identified by the corresponding user identifier 804. It will be understood that the table 800 may comprise any suitable number of list identifiers 802 and user identifiers 804 for each list identifier 802 without departing from the scope of the present invention.

A list identifier 802 may identify a subscriber who has set up a personal list of user identifiers 804 from which the subscriber may select recipients for messages. In addition, a list identifier 802 may identify a group of users such that a subscriber may include the group as a user identifier 804. This allows each user identifier 804 for that group to be included as a recipient when the group's list identifier 802 is selected as a message recipient by the subscriber. According to one embodiment, a subscriber may also choose to receive the user identifiers 804 corresponding to a particular group's list identifier 802 as choices for recipient selections instead of receiving a personal list as previously described.

Thus, in the illustrated embodiment, for example, a subscriber named Joe Banks may set up a personal message recipient list with a list identifier 802 of Joe. Joe Banks may include in the Joe list any number of users and/or groups of users. In this embodiment, the Joe list includes two user identifiers 804 corresponding to particular users, Mark and Cathy, in addition to one user identifier 804 corresponding to a particular group of users, Sales. Thus, when Joe Banks is generating a message to be sent, the user identifiers 804 of Mark, Cathy and Sales may be displayed for selection as recipients of the message. In this way, Joe Banks may provide user identifiers 804 for each of a plurality of users which he may easily remember. Alternatively, Joe Banks may request the Client Relations list instead of the Joe list, in which case he will receive the user identifiers 804 corresponding to the Client Relations list identifier 802 as possible message recipients instead of his own personal list.

In the illustrated embodiment, a subscriber named Karen Johnson has set up a list with a list identifier 802 of Karen. Karen Johnson has included a user identifier 804 of Catherine for the same user identified by Joe Banks as Cathy, as indicated by a same mobile station identifier 806 for these two user identifiers 804. Thus, as Karen Johnson knows another user by Catherine, she may use the name Catherine as a user identifier 804, while Joe Banks, who knows the same user as Cathy, may use the name Cathy. In this situation which allows a single user to be identified by multiple user identifiers 804, an update of a mobile station identifier 806 for this user may be performed by searching the table 800 for the original mobile station identifier 806, which may then be updated with a new mobile station identifier 806.

According to one embodiment, a manager, an administrator, or other suitable authorized person may set up group lists with list identifiers 802 such as Client Relations, Sales or other suitable groupings of users. As illustrated, the group list of Client Relations may be set up with a user identifier 804 of Mark, which is the same user identifier 804 provided by Joe Banks. However, the Mark included in the Client Relations list is a different user from the Mark included in the Joe list. Thus, each user identifier 804 corresponding to a same list identifier 802 is unique, but identical user identifiers 804 may exist when they correspond to different list identifiers 802.

Each user identifier 804 is assigned to a particular mobile station identifier 806, with the exception of user identifiers 804 corresponding to groups of users. Thus, in the illustrated embodiment, for example, the user identifier 804 of Sales has a mobile station identifier 806 of L1 to indicate that the user is a group of users with a corresponding list identifier 802. Thus, if Joe Banks selects Sales as a recipient for a message, the user identifiers 804 corresponding to the list identifier 802 of Sales are included as recipients for the message.

It will be understood that the table 800 may comprise numerous alternative embodiments without departing from the scope of the present invention. For example, list identifiers 802 may be excluded from the table 800 when a single list is to be provided to every subscriber for recipient selection. In this situation, each user identifier 804 is unique with respect to the other user identifiers 804. As another example, an additional column or columns may be included in the table 800 in which additional mobile station identifiers 806 for one user identifier 804 may be stored. Thus, for example, a recipient may receive a message sent from a sender based on her user identifier 804 at both her mobile telephone and her pager. In this way, a sender may have the option of sending the message to a preferred mobile station identifier or identifiers 806 or to all mobile station identifiers 806 for the corresponding user identifier 804 to increase the probability that the intended recipient will receive the message as soon as possible.

In operation, the personal message recipient list may be provided to a subscriber as a default list. The subscriber may then choose whether to select user identifiers 804 from the personal message recipient list or from another list, such as the Sales list. It will be understood that any suitable list may be provided to a subscriber as a default list and that, according to one embodiment, only one list is available to the subscriber. After the subscriber finishes drafting a message and selects one ore more user identifiers 804 from either his personal message recipient list or other message recipient list, private network 202 may then access the table 800 to determine, based on the message recipient list identifier 802 and the user identifiers 804, which mobile station identifiers 806 correspond to the mobile stations 206 which are to receive the message.

According to one embodiment, private network 202 comprises a message addressing module which is operable to determine the appropriate mobile station identifiers 806 based on user identifiers 804 and/or based on a list identifier 802 and user identifiers 804. In addition, private network 202 comprises an update function operable to update the assignments of user identifiers 804 to mobile station identifiers 806. According to one embodiment, subscriber location register may comprise the message addressing module and/or the update function. However, it will be understood that any other suitable component of private network 202 may comprise either one or both of the message addressing module and the update function.

Although the present invention has been described with several embodiments, a number of changes, substitutions, variations, alterations, and modifications may be suggested to one skilled in the art, and it is intended that the invention encompass all such changes, substitutions, variations, alterations, and modifications that fall within the spirit and scope of the appended claims.

What is claimed is:

1. A system for providing message services through a private network and a mobile station, comprising:
   at least one processor; and
   logic in a memory, the logic operable when executed by the processor to receive a user notification message in an application, to receive a user identifier for at least one recipient of the message in the application, the user identifier operable to identify the recipient, and to provide the message and the user identifier from the application to the private network operable to transmit the message to the mobile station for the recipient, the mobile station having a corresponding mobile station identifier, the user identifier assigned to the mobile station identifier in the private network.

2. A system for providing message services through a private network and a mobile station, comprising:
   at least one processor; and
   logic in a memory, the logic operable when executed by the processor to receive a user notification message in the private network, to receive in the private network a user identifier for at least one recipient of the message, the user identifier operable to identify the recipient, to determine a mobile station identifier based on the user identifier, and to transmit the message to the mobile station for the recipient based on the mobile station identifier.

3. A system for providing message services through a private network and a mobile station, comprising:
   at least one processor; and
   logic in a memory, the logic operable when executed by the processor to assign a user identifier to a first mobile station identifier corresponding to a first mobile station in the private network, to receive in the private network a first message and the user identifier, the user identifier operable to identify a recipient for the first message, to determine a mobile station identifier for the first message based on the user identifier, the mobile station identifier for the first message comprising the first mobile station identifier, to transmit the first message to the first mobile station based on the first mobile station identifier, to assign the user identifier to a second mobile station identifier corresponding to a second mobile station in the private network, to receive in the private network a second message and the user identifier, the user identifier operable to identify a recipient for the second message, the recipient for the second message comprising the recipient for the first message, to determine a mobile station identifier for the second message based on the user identifier, the mobile station identifier for the second message comprising the second mobile station identifier, and to transmit the second message to the second mobile station based on the second mobile station identifier.

4. The system of claim 1, the application comprising a Web-based interface operable to provide access to the private network.

5. The system of claim 1, wherein the logic is further operable when executed to receive authentication information from a sender of the message.

6. The system of claim 5, the authentication information comprising at least one of a user name and a password.

7. The system of claim 5, wherein the logic is further operable when executed by the processor to provide the authentication information to the private network for authentication of the sender.

8. The system of claim 7, wherein the logic is further operable when executed by the processor to determine whether the sender has been authenticated by the private network.

9. The system of claim 8, wherein the logic is further operable when executed by the processor to receive a confirmation of the authentication from the private network when the sender is authenticated by the private network.

10. The system of claim 9, wherein receiving a user notification message comprises receiving the message when the sender has been authenticated by the private network.

11. The system of claim 1, wherein the logic is further operable when executed by the processor to receive a selection of the user identifier from a message recipient list of user identifiers.

12. The system of claim 1, wherein the logic is further operable when executed by the processor to:
   access a plurality of message recipient list identifiers for selection;
   identify a selection of at least one message recipient list identifier;
   provide a message recipient list of user identifiers for selection based on the selected message recipient list identifier; and
   receive a user identifier comprising receiving a selection of the user identifier from the provided message recipient list.

13. The system of claim 1, wherein the logic is further operable when executed by the processor to receive a send message command, and wherein when providing the message and the user identifier from the application to the private network the logic is further operable to provide the message and the user identifier when the "send message" command is received.

14. The system of claim 2, wherein the logic is further operable when executed by the processor to:
   request authentication information for a sender;
   receive the authentication information for the sender from an application;
   determine whether the sender is authenticated; and
   provide confirmation of the authentication to the application when the sender is determined to be authenticated.

15. The system of claim 14, wherein the authentication information comprises at least one of a user name and a password.

16. The system of claim 14, wherein the application comprises a Web-based interface.

17. The system of claim 14, wherein when determining whether the sender is authenticated the logic is further operable to determine whether the sender is authenticated based on a stored service profile for the sender.

18. The system of claim 2, wherein when determining a mobile station identifier based on the user identifier the logic is further operable to determine the mobile station identifier based on a stored assignment of the user identifier to the mobile station identifier.

19. The system of claim 3, wherein the user identifier comprises at least one of a first name, a last name and a nickname for the recipient.

20. The system of claim 3, wherein the first mobile station comprises a mobile telephone.

21. The system of claim 20, wherein the first mobile station identifier comprises a telephone number for the mobile telephone.

22. The system of claim 3, wherein the logic is further operable when executed by the computer to:
   assign the user identifier to a second mobile station identifier corresponding to a second mobile station in the private network;
   receive in the private network a second message and the user identifier, the user identifier operable to identify a recipient for the second message, the recipient for the second message comprising the recipient for the first message;
   determine a mobile station identifier for the second message based on the user identifier, the mobile station identifier for the second message comprising the second mobile station identifier; and
   transmit the second message to the second mobile station based on the second mobile station identifier.

23. The system of claim 22, wherein the user identifier comprises at least one of a first name, a last name and a nickname for the recipient.

24. The system of claim 22, wherein the first mobile station comprises a mobile telephone.

25. The system of claim 24, wherein the first mobile station identifier comprises a telephone number for the mobile telephone.

26. The system of claim 22, wherein the first mobile station comprises the second mobile station.

* * * * *